United States Patent
Zhou (10) Patent No.: US 10,719,957 B2
(45) Date of Patent: Jul. 21, 2020

(54) SYSTEM AND METHOD FOR CALIBRATING ON-BOARD VEHICLE CAMERAS

(71) Applicant: Pony AI Inc., Cayman Islands (KY)

(72) Inventor: Jun Zhou, Mountain View, CA (US)

(73) Assignee: Pony AI Inc., Grand Cayman (KY)

( * ) Notice: Subject to any disclaimer, the term of this patent is extended or adjusted under 35 U.S.C. 154(b) by 0 days.

(21) Appl. No.: 16/524,628

(22) Filed: Jul. 29, 2019

(65) Prior Publication Data

US 2020/0034988 A1 Jan. 30, 2020

Related U.S. Application Data

(60) Provisional application No. 62/712,045, filed on Jul. 30, 2018.

(51) Int. Cl.
| | |
|---|---|
| *G06T 7/80* | (2017.01) |
| *G06T 7/70* | (2017.01) |
| *H04N 17/00* | (2006.01) |
| *H04N 5/247* | (2006.01) |
| *B60R 11/04* | (2006.01) |
| *G01S 17/86* | (2020.01) |

(Continued)

(52) U.S. Cl.
CPC ............ *G06T 7/80* (2017.01); *B60R 11/04* (2013.01); *G01S 17/86* (2020.01); *G06T 7/70* (2017.01); *H04N 5/247* (2013.01); *H04N 17/002* (2013.01); *B60R 2011/004* (2013.01); *G05D 1/0246* (2013.01); *G05D 1/0248* (2013.01); *G05D 2201/0213* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 7,289,019 B1 * | 10/2007 | Kertes | ............... B60Q 9/008 340/435 |
| 8,717,442 B2 | 5/2014 | Inui et al. | |
| 8,842,181 B2 | 9/2014 | Kosaki | |

(Continued)

FOREIGN PATENT DOCUMENTS

| | | |
|---|---|---|
| WO | WO-2014/044265 | 3/2014 |
| WO | WO-2018/138584 | 8/2018 |

OTHER PUBLICATIONS

WO20140442654 English Translation retrieved via Google Patents (Year: 2014).*

(Continued)

*Primary Examiner* — Fernando Alcon
(74) *Attorney, Agent, or Firm* — Sheppard Mullin Richter & Hampton LLP (57) ABSTRACT

Provided herein are methods for calibrating a camera. The method may include capturing an image that includes at least a traffic sign. The location of the traffic sign using the image may then be determined, which may include taking as input the location and direction of the vehicle and the location and the direction of the camera relative to the vehicle. The method may also include obtaining an actual location of the traffic sign. The camera may be determined to require recalibration if the determined location is different from the actual location.

18 Claims, 5 Drawing Sheets

(51) Int. Cl.
    *G05D 1/02*           (2020.01)
    *B60R 11/00*         (2006.01)

(56)                 References Cited

U.S. PATENT DOCUMENTS

| | | |
|---|---|---|
| 9,201,424 B1 | 12/2015 | Ogale |
| 1,017,659 A1 | 1/2019 | Mou |
| 10,304,210 B2 | 5/2019 | Lewis et al. |
| 2004/0133376 A1* | 7/2004 | Uffenkamp ............ G01D 18/00 702/104 |
| 2006/0125679 A1* | 6/2006 | Horibe ................... G01S 17/86 342/52 |
| 2008/0007619 A1* | 1/2008 | Shima ....................... G06T 7/80 348/118 |
| 2011/0115912 A1* | 5/2011 | Kuehnle ............ G06K 9/00798 348/148 |
| 2011/0157373 A1 | 6/2011 | Ye et al. |
| 2013/0002871 A1* | 1/2013 | Natroshvili ............... G06T 7/80 348/148 |
| 2014/0036084 A1* | 2/2014 | Lu .......................... B60R 11/04 348/148 |
| 2014/0168377 A1* | 6/2014 | Cluff .................... H04N 13/246 348/47 |
| 2014/0333729 A1 | 11/2014 | Pflug |
| 2015/0127239 A1 | 5/2015 | Breed et al. |
| 2017/0308989 A1* | 10/2017 | Lee ........................ B60R 11/04 |
| 2019/0011927 A1 | 1/2019 | Mou |

OTHER PUBLICATIONS

International Search Report and Written Opinion for PCT/US2019/043865 dated Oct. 22, 2019, 9 pages.

\* cited by examiner

SYSTEM AND METHOD FOR CALIBRATING ON-BOARD VEHICLE CAMERAS

CROSS REFERENCE TO RELATED APPLICATIONS

This application claims the benefit of and priority to U.S. Provisional Patent Application No. 62/712,045 filed on Jul. 30, 2018, which is hereby incorporated by reference in its entirety.

BACKGROUND

Vehicles, especially autonomous vehicles, often operate with the assistance of multiple on-board cameras to supplement and bolster the vehicle's field of vision by providing accurate image information. Often, images captured by the on-board cameras utilize a coordinate system to determine the distance and angle of the contents and objects captured in the image. Such real-time space information may be acquired near the vehicle using various on-board cameras located throughout the vehicle, which may then be processed to calculate and to determine the safe driving operation of the vehicle. As a result, it is imperative that the on-board cameras are mounted and adequately calibrated to the correct location, placement, and angle in order for the on-board cameras to properly detect and measure objects without error.

Current solutions include installing calibration panels in select areas (e.g., garage) to calibrate the on-board cameras However, this requires not only the installation of hardware, but also severely restricts the number of calibrations that may be performed throughout the day, especially since the vehicle must be parked or stationed near the calibration panel. As a result, the on-board cameras may then go uncalibrated for an extended period of time.

SUMMARY

Described herein are methods and systems for calibrating on-board vehicle cameras. In one embodiment, provided is a method for recalibrating a camera installed on a vehicle, comprising capturing, with the camera, an image includes at least a traffic sign; determining the location of the traffic sign using the image, taking as input the location and the direction of the vehicle and the location and the direction of the camera relative to the vehicle; obtaining an actual location of the traffic sign; and determining that the camera requires recalibration if the determined location is different from the actual location.

In some embodiments, the method further entails correcting the location or the direction of the camera relative to the vehicle such that the determined location of the traffic sign, following the correction, matches the actual location of the traffic sign.

In some embodiments, the traffic sign is selected from the group consisting of a traffic light, a stop sign, and a street sign. In some embodiments, the traffic sign is a traffic light. In some embodiments, two or more traffic lights are captured in the image and used for the recalibration.

In some embodiments, the actual location of the traffic sign is obtained from a high-precision GPS map stored in a storage device in the vehicle. In some embodiments, the actual location of the traffic sign is obtained by one or more other cameras on the vehicle. In some embodiments, the actual location of the traffic sign is obtained by a LiDAR unit on the vehicle. In some embodiments, the location and the direction of the vehicle is determined by a GPS unit in the vehicle.

Another embodiment of the present disclosure provides a method for recalibrating a camera installed on a vehicle, comprising capturing, with the camera, an image includes at least a traffic sign; obtaining an actual location of the traffic sign; determining a projected position of the traffic sign in the image, taking as input the location and the direction of the vehicle and the location and the direction of the camera relative to the vehicle; and determining that the camera requires recalibration if the traffic sign is not at the determined position in the image.

In some embodiments, the method further entails correcting the position of the camera relative to the vehicle such that the determined position of the traffic sign, following the correction, matches the projected position of the traffic sign. In some embodiments, the traffic sign is selected from the group consisting of a traffic light, a stop sign, and a street sign. In some embodiments, the traffic sign is a traffic light. In some embodiments, two or more traffic lights are captured in the image and used for the recalibration.

In some embodiments, the projected position the traffic sign captured in the image is at a left angle view, a right angle view, a bottom angle view, a front angle view, or a back angle view. In some embodiments, the actual location of the traffic sign is obtained by one or more other cameras on the vehicle. In some embodiments, the actual location of the traffic sign is obtained by a LiDAR unit on the vehicle. In some embodiments, the location and the direction of the vehicle is determined by a GPS unit in the vehicle.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

DETAILED DESCRIPTION

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments of the present disclosure provide systems and methods for calibrating or recalibrating one or more cameras on a vehicle. The calibration takes advantages of traffic signs that are commonly seen when the vehicle is in operation, in particular those that the camera needs to capture to guide/adjust operation. A non-limiting example of the traffic sign is a traffic light. When a vehicle is approaching an intersection, one or more of the cameras are instructed to detect the color of one or more of the traffic lights at the intersection so as to decide the appropriate driving action.

To ensure efficient detection of the traffic lights, the vehicle can be pre-equipped with a high definition GPS map that includes GPS positions of the traffic lights. Therefore, with the GPS position of the vehicle, the orientation of the vehicle and the location of camera on the vehicle, the vehicle can accurately predict the location of the lights relative to the camera. Such a relative location can be compared to the location actually determined by the camera with existing calibration parameters. If the two locations match (or have a limited mismatch), then no re-calibration is required. If the two locations do not match with each other (or the distance is greater than a threshold), then re-calibration may be required and/or performed.

In one embodiment, the calibration method entails capturing, with the camera, an image of at least a traffic sign; determining the location of the traffic sign using the image, taking as input the location and the direction of the vehicle and the location and the direction of the camera relative to the vehicle; obtaining an actual location of the traffic sign; and determining that the camera requires recalibration if the determined location is different from the actual location.

Alternatively, in another embodiment, the method entails capturing, with the camera, an image includes at least a traffic sign; obtaining an actual location of the traffic sign; determining a projected position of the traffic sign in the image, taking as input the location and the direction of the vehicle and the location and the direction of the camera relative to the vehicle; and determining that the camera requires recalibration if the traffic sign is not at the determined position in the image.

Figure 1:
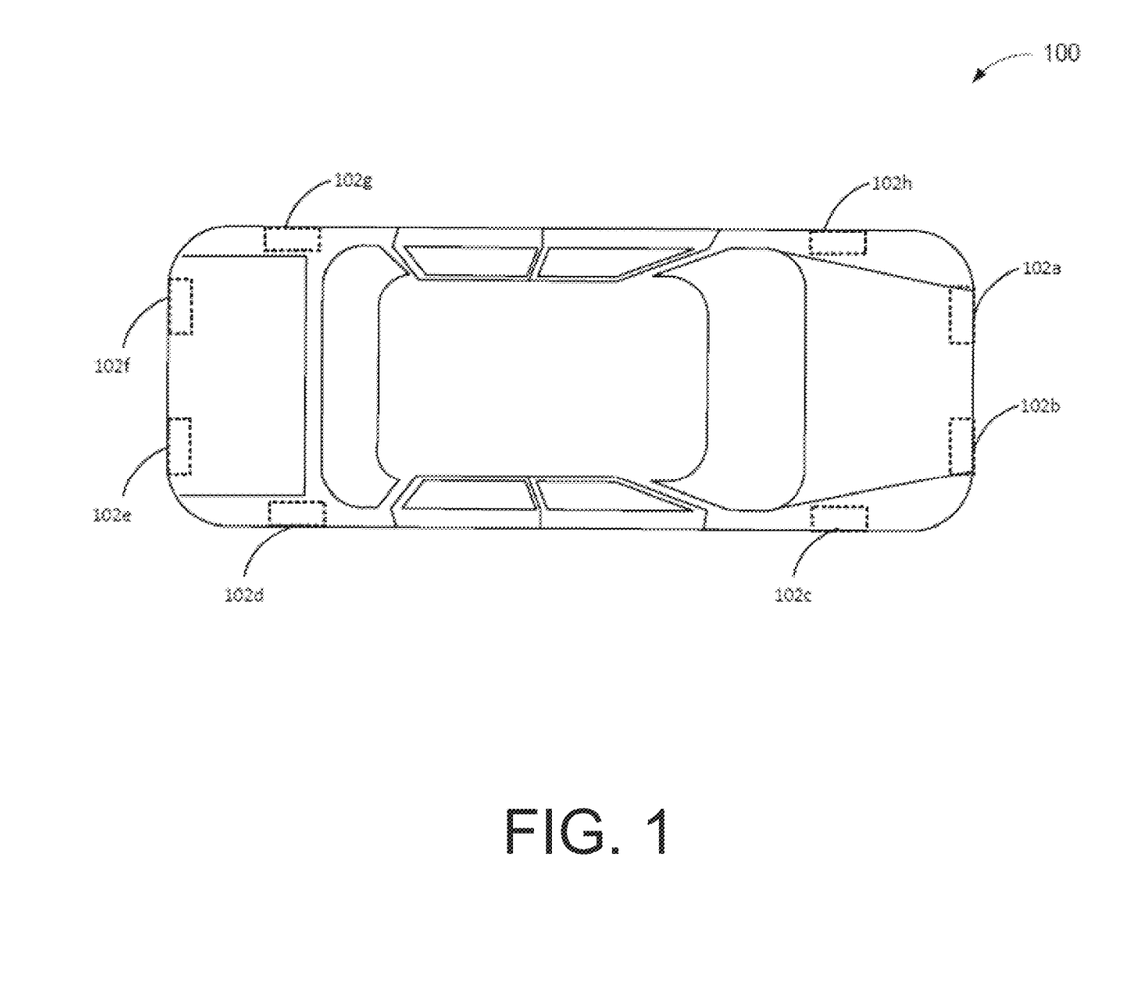
FIG. 1 is a schematic diagram depicting an example of vehicle that includes a plurality of on-board cameras according to an embodiment.

Various embodiments described herein are directed to a system and a method for calibrating on-board vehicle camera. FIG. 1 is a schematic diagram depicting an example of vehicle 100 that includes a plurality of on-board camera mounts 102a-102g according to an embodiment. The vehicle 100 in the present disclosure is intended to represent a vehicle 100 that is capable of sensing its environment and navigating with a limited human input or without human input utilizing the on-board camera placed on the on-board camera mounts 102a-102g. In the example depicted in FIG. 1, the vehicle 100 includes eight on-board camera mounts 102a-102g (hereinafter collectively referred to as on-board camera unit 102), which may be configured to mount various on-board cameras. By way of example, the on-board cameras may be a still camera and/or video camera that may capture images and videos of the front, sides, and rear surrounding areas of the vehicle 100. The on-board cameras may be mounted and oriented in a particular position and angle on top of the on-board camera mounts 102a-102g to take images and videos of preceding vehicles and oncoming vehicles, as well as pedestrians, objects, and road conditions surrounding the general vicinity of the vehicle 100.

In one embodiment, the vehicle 100 is one of regular passenger vehicle types such as sedan, SUV, hatchback, and so on. In another embodiment, the vehicle 100 is one of commercial vehicle types such as bus, truck, trailer, and so on. In the example of FIG. 1, the assisted-driving vehicle 100 is capable of sensing its environment based on inputs from one or more of the on-board camera mount units 102. More specifically, the on-board camera mount unit 102 may include two on-board camera mount units (front camera mount units) 102a and 102b, two on-board camera mount units (right camera mount units) 102c and 102d, two on-board camera mount units (rear camera mount units) 102e and 102f, and two on-board camera mount units (left camera mount units) 102g and 102h. Each of the on-board camera mount units 102 may be configured to capture images, such as frame images. However, it should be noted that on-board camera mount units 102 may also be configured to mount other various sensors, such as LiDAR (Light Detection and Ranging) and radar sensors.

In some embodiments, the number and the mounting positions of the on-board camera mount units 102 may be different from the example depicted in FIG. 1. For example, the total number of the on-board camera mount units 102 may be less than or greater than eight. In another example, the number of the on-board camera mount units 102 on each side of the vehicle 100 may be smaller or greater than two. In more specific embodiment, the number (e.g., three) of the on-board camera mount units 102 on the front side of the vehicle 100 may be greater than the number (e.g., two) of the focus-variable lens mount units 102 on the other sides of the vehicle 100. Advantageously, such a configuration is capable of capturing more images on the front side of the vehicle 100, which require more images for assisted-driving when the vehicle 100 proceeds in the forward direction.

Figure 2:
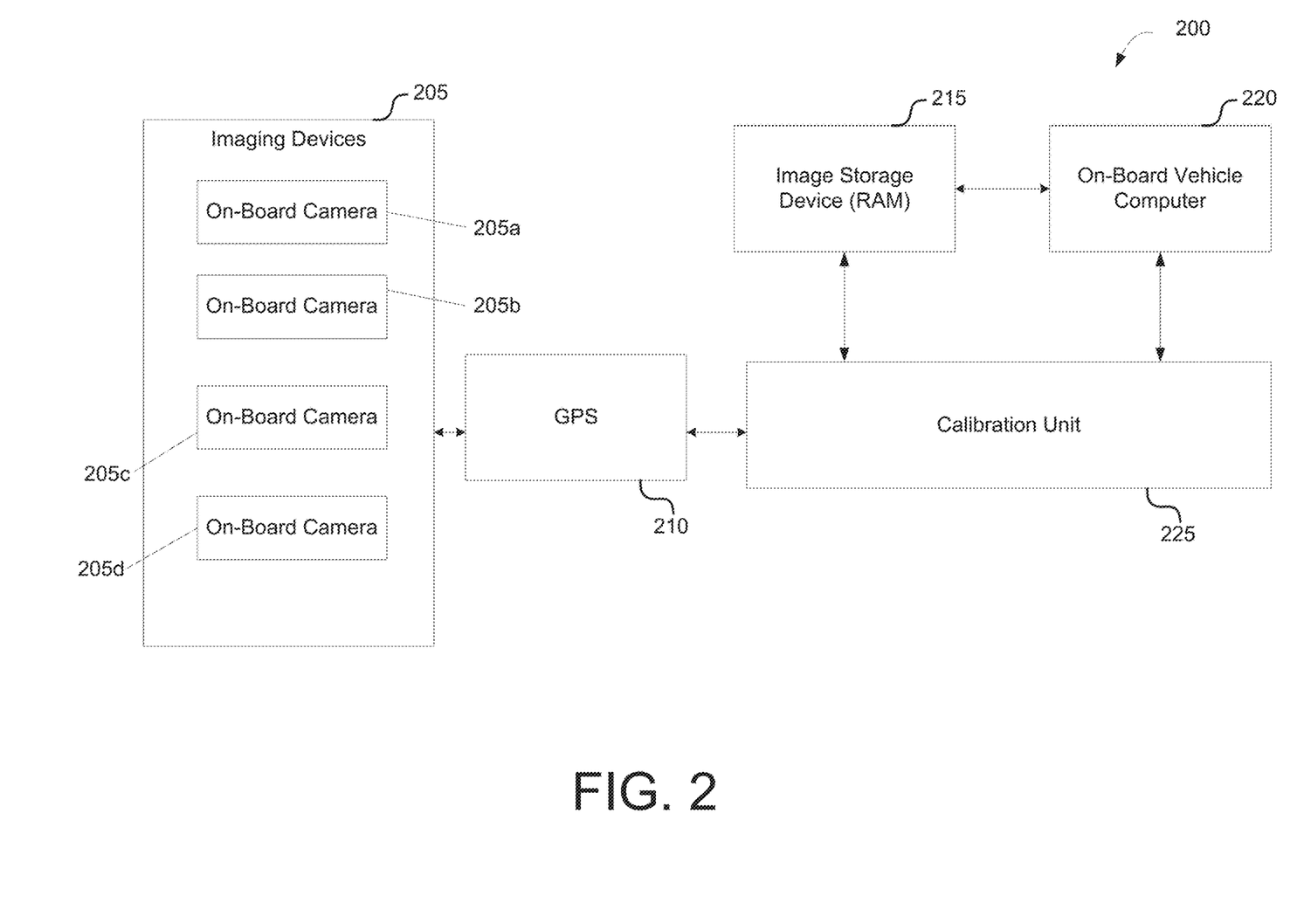
FIG. 2 illustrates on-board camera calibration system in accordance with various embodiments.

FIG. 2 illustrates on-board camera calibration system 200 in accordance with various embodiments. The camera calibration system 200 may include a group of imaging devices 205, which may include one or more on-board cameras 205a, 205b, 205c, 205d; a high precision GPS 210; an image storage device (RAM) 215; an on-board vehicle computer 220; and a calibration unit 225.

In some embodiments, the imaging devices 205 may include one or more on-board cameras 205a, 205b, 205c, 205d configured to capture and output images. More specifically, the on-board cameras 205a, 205b, 205c, 205d may be configured to capture an image of a pre-determined calibration target. By way of example, a pre-determined calibration target may include a traffic sign. In some instances, the traffic sign may be a traffic light. The on-board cameras 205a, 205b, 205c, 205d may then be configured to capture images of select portions or all three light bulbs on the traffic light. In other instances, the on-board cameras 205a, 205b, 205c, 205d may be configured to capture images of the frame of the traffic light. Additionally, in other instances, the on-board cameras 205a, 205b, 205c, 205d may be configured to capture images of both the light bulbs and the traffic sign frame.

As used herein, a pre-determined calibration target may comprise an object already deployed in a "real world" environment (e.g., not a garage and/or other testing-specific environment) for a purpose other than camera calibration. For example, as discussed elsewhere herein, the pre-determined calibration target may comprise a traffic light.

It should be noted that a traffic sign as a pre-determined calibration target need not be limited to a traffic light. Instead, the traffic signs may also include stop signs, street signs, and the like as other pre-determined calibration targets. Additionally, the predetermined calibration target may include other objects or items that appear in high frequency located on or near the road and that are also readily visible on the road. Any of the captured images of the pre-determined calibration target may be stored in the image storage device (RAM) 215 to be reviewed and processed by the on-board vehicle computer 220.

The vehicle may be notified that the pre-determined calibration target (e.g., traffic sign) is approaching up ahead on the road by using information provided by the GPS 210. For example, the GPS 210 may be a high-precision GPS with a detailed map that provides the actual locations of the traffic signs that are present on the road. The GPS 210 may be continuously and frequently updated in order to include the most up-to-date information regarding the locations of the traffic signs.

The GPS 210 may be configured such that when the GPS 210 detects that the vehicle is approaching a traffic sign ahead as indicated in the detailed map, the GPS 210 may send a signal to the imaging device 205 to capture one or more images of the traffic sign anticipated ahead. The GPS 210 may further be configured so that when a vehicle is at a select pre-determined distance from the anticipated traffic sign, the GPS 210 may then send a signal to the on-board cameras 205a, 205b, 205c, 205d to capture images of the expected traffic sign ahead.

Once the on-board cameras 205a, 205b, 205c, 205d of the imaging device 205 capture images of the anticipated traffic sign ahead, the captured images may be processed by the on-board vehicle computer 220. The on-board vehicle computer 220 may determine the location of the traffic sign using the captured images from the on-board cameras 205a, 205b, 205c, 205d. To do so, the on-board vehicle computer 220 may input the vehicle's location and direction at the time the images were captured by the on-board cameras 205a, 205b, 205c, 205d. For example, the location of the vehicle when the one or more images were captured by on-board cameras 205a, 205b, 205c, 205d may be provided by the GPS 210 in real time. Additionally, the vehicle's direction, such as the vehicle's angle and position at the time the one or more images of the traffic sign were captured may also be provided by the GPS 210 in real time. In some instances, the location and direction of the on-board camera 205a, 205b, 205c, 205d relative to the vehicle may also be input in the on-board vehicle computer 220 to determine the location of the traffic sign sourced from the image.

To determine whether the on-board cameras 205a, 205b, 205c, 205d need to be recalibrated, the determined location of the traffic sign extracted from the images may then be compared with the actual location of the traffic sign. The actual location of the traffic sign with respect to the vehicle may be determined in real time using the information sourced from a map stored in the GPS 210.

In other instances, the actual location of the traffic sign may be determined by using the on-board cameras 205a, 205b, 205c, 205d. The on-board cameras 205a, 205b, 205c, 205d may also be configured to recognize the predetermined calibration targets (e.g., traffic signs). Once the predetermined calibration targets are recognized and identified, the vehicle may then determine the distance between each of the on-board cameras 205a, 205b, 205c, 205d and the identified traffic signs on the road. The distance may be determined using various sensors, such as LiDAR sensors and other optical sensors. With the use of the LiDAR sensor, the LiDAR sensor may transmit a light pulse when the GPS 210 signals the identified location of a traffic sign ahead. The LiDAR sensor may then transmit a light pulse to be reflected onto the traffic sign. The distance between the light sign and the vehicle is calculated from the propagation time of the light pulse. Utilizing the detected distance between the on-board cameras 205a, 205b, 205c, 205d with respect to the location and direction of the vehicle sourced from the GPS 210, the actual location of the traffic sign may be determined.

In other instances, the actual location of the traffic sign may also be determined using a LiDAR sensor positioned on a vehicle. As described above, the LiDAR sensor may be signaled by the GPS 210 to transmit a pulse when the GPS 210 identifies the anticipated location of a traffic sign ahead. Thus, the LiDAR sensor may be able to determine the exact distance and location of the actual location of the traffic sign by determining the distance of the traffic sign with respect to the location and direction of the vehicle.

By comparing the determined location of the traffic sign extracted from the images and the actual location of the traffic sign processed by the on-board vehicle computer 220, the on-board cameras 205a, 205b, 205c, 205d may determine whether any of the on-board cameras 205a, 205b, 205c, 205d need to be recalibrated. For example, if the determined location is different from the actual location with respect to a particular obtained image from a specific on-board camera 205a, 205b, 205c, 205d, the calibration module 225 may determine which on-board cameras 205a, 205b, 205c, 205d need to be recalibrated. Once those particular on-board cameras 205a, 205b, 205c, 205d that need to be recalibrated have been detected by the calibration unit 225, the calibration unit 225 may signal the select on-board cameras 205a, 205b, 205c, 205d that need to be recalibrated. The calibration unit 225 may correct the location and direction of those on-board cameras 205a, 205b, 205c, 205d relative to the vehicle, such that the determined location of the determined traffic sign from the captured image, following the correction, would then match the actual location of the traffic sign once the on-board cameras 205a, 205b, 205c, 205d have been recalibrated.

In other embodiments, determining whether the on-board cameras 205a, 205b, 205c, 205d need to be recalibrated may also be determined using a projected position of the traffic sign from the captured images of the on-board cameras 205a, 205b, 205c, 205d. Determining the projected position of the traffic sign may be determined by processing the captured images of the traffic sign with the on-board vehicle computer 220. Once, the on-board cameras 205a, 205b, 205c, 205d capture the image of the anticipated traffic sign ahead, the on-board vehicle computer 220 may input the vehicle's location and direction at the time the images were captured by the on-board cameras 205a, 205b, 205c, 205d. In addition, the on-board vehicle computer 220 may also input the location and direction of the camera relative to the vehicle. Using these inputted information, the on-board vehicle computer 220 may then be able to determine a projected position of the traffic sign in the captured image of the traffic sign relative to each of the on-board cameras 205a, 205b, 205c, 205d. For example, the on-board vehicle computer 220 may be able to project whether the captured image of the traffic sign includes a left angle view, right angle view, bottom angle view, front angle view, or back angle view of the traffic sign.

In order to determine whether the on-board cameras 205a, 205b, 205c, 205d need to be recalibrated utilizing the projected position of the traffic sign with respect to the captured images, the projected position of the traffic sign is compared with the actual position of the traffic sign at the time the images were captured.

In order to identify the actual position of the traffic sign, the on-board vehicle computer 220 may determine the actual location of the traffic sign at the time the images of the traffic sign were captured by the on-board cameras 205a, 205b, 205c, 205d. As discussed above, the actual location of the traffic sign may be determined using any one of GPS, cameras, and LiDAR sensors. To then determine the actual position of the traffic sign, the on-board camera may then use the actual location of the traffic sign in relation to the vehicle's location and direction at the time the images of the traffic sign were captured by the on-board cameras 205a, 205b, 205c, 205d. As a result, the on-board vehicle computer 220 may then be able to determine the actual position of the traffic sign with respect to the vehicle and the on-board cameras 205a, 205b, 205c, 205d, which may include whether the traffic sign was positioned at a left angle view, right angle view, bottom angle view, front angle view, or back angle view of the traffic sign with respect to the vehicle and each of the on-board cameras 205a, 205b, 205c, 205d.

In order to identify whether the on-board cameras 205a, 205b, 205c, 205d need to be recalibrated, the projected position of the traffic sign captured in the images are then compared to the actual determined position of the traffic sign. In the instance that the projected position of the traffic sign captured is different from the actual position of the traffic sign, the calibration unit 225 is then signaled that the one or more of the on-board cameras 205a, 205b, 205c, 205d need to be recalibrated. The calibration unit 225 may determine which of the on-board cameras 205a, 205b, 205c, 205d are producing the skewed captured images of the traffic sign. The calibration unit 225 may then correct the location and direction of the appropriate on-board camera 205a, 205b, 205c, 205d relative to the vehicle such that the projected position of the traffic sign in the image, following the correction, will then match the actual position of the traffic sign.

Figure 3:
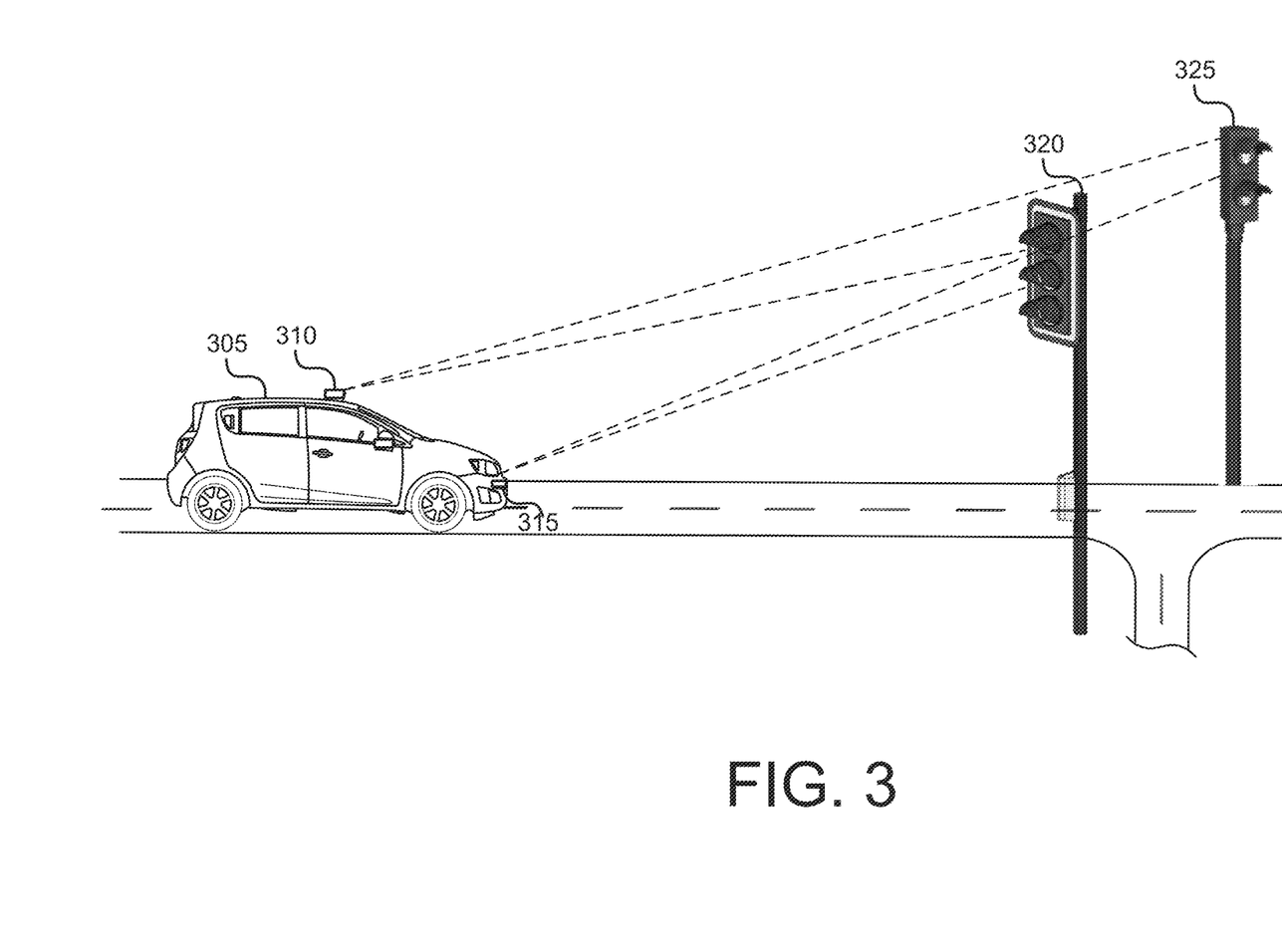
FIG. 3 illustrates a vehicle with multiple on-board cameras calibrated by multiple traffic lights at an intersection in accordance with various embodiments.

As illustrated in FIG. 3, one or more traffic signs 320, 325 may be located at an intersection or at a section of a road. By way of example, each of the on-board cameras 310, 315 may be configured to recognize and detect each of the plurality of traffic signs 320, 325 as the vehicle 305 approaches the traffic signs 320, 325. The traffic signs 320, 325 may then be used to reconfigure the on-board cameras if needed. While this particular example discloses two on-board cameras 310, 315 located on the vehicle 305, it should be noted that any number of on-board cameras may mounted on the vehicle 305.

Because there may be multiple traffic signs 320, 325 at a given intersection, each of the on-board cameras 310, 315 may have one or more viewing angles of various profiles of the traffic signs 320, 325 (e.g., front view of a traffic light, side view of a traffic light, back view of a traffic light, and a bottom view of a traffic light). As a result, each obtained image of the various profile views of the calibration target may then be utilized to determine the location and position of the various traffic signs using the captured images of the on-board cameras. This may then allow for a single on-board camera to obtain images of various angles and viewpoints of the multiple traffic signs 320, 325.

The determined location and determined position of each of the traffic signs 320, 325 may be utilized from the captured images provided by the on-board cameras 310, 315. More specifically, the determined location and determined position of each of the traffic signs may then be compared to the actual location and actual position of the traffic signs. A recalibration of the appropriate in-vehicle cameras may be determined and recalibrated accordingly in the instance that the actual location or actual position of the traffic signs does not align with the determined location or determined position sourced from the captured images.

In some embodiments, the calibration unit 225 may recalibrate and/or determine whether to recalibrate the one or more imaging device 205 (e.g., on-board camera 205a, on-board camera 205b, on-board camera 205c, and/or on-board camera 205d) each time an eligible pre-determined calibration target is detected (e.g., traffic light, stop sign) and/or each time a particular type of pre-determined calibration is detected (e.g., traffic light). In some embodiments, the calibration unit 225 may recalibrate and/or determine whether to recalibrate the one or more imaging device 205 periodically and/or based on one or more thresholds. For example, the calibration unit 225 may determine whether to recalibrate one or more imaging devices 205 every other detected pre-determined calibration target, every third detected pre-determined calibration target, and/or the like. The calibration unit 225 may also determine whether to perform a recalibration at various time intervals. For example, if a pre-determined calibration target is detected and a recalibration and/or a determination as to whether a recalibration should performed has not happened with a predetermined amount of time (e.g., 1 hours, 1 day), then the calibration unit 205 may trigger a recalibration and/or a determination whether to perform a recalibration. As used herein, "time" may be travel time of the vehicle (e.g., an amount of time that the vehicle is turned on and/or moving) and/or an absolute time (e.g., elapsed time regardless of whether the vehicle is turned on, turned off, moving, not moving, and/or the like).

In some embodiments, the calibration unit 205 may use one or more thresholds to perform a recalibration and/or determine whether to perform a recalibration. For example, the calibration unit 205 may keep a history of prior recalibrations. If the number of recalibrations within a period of travel time (e.g., 1 day) and/or travel distance (e.g., 300 miles) is below a threshold value (e.g., 5 recalibrations) this may indicate that the imagining devices 205 are functioning at a high (or, "optimal") level, and the number and/or rate that recalibrations are performed (and/or determinations whether to recalibrate) may be reduced (e.g., recalibrate and/or determine whether to recalibrate once every two days instead of once every day). This may, for example, reduce a computational load on the system, and make available various computational resources for other tasks. On the other hand, if the number of a calibrations within a period of travel time and/or travel distance is above a threshold value (e.g., 5 recalibrations) this may indicate that the imaging devices 205 are functioning at a low (or, "sub-optimal") level, and the number and/or rate that recalibrations are performed (and/or determinations whether to recalibrate) may be increased (e.g., recalibrate and/or determine whether to recalibrate once every two days instead of once every day). Threshold values may be adjusted manually (e.g., based on user input) and/or automatically (e.g., without requiring user input). For example, the calibration unit 205 may use machine learning to dynamically update and/or assign threshold values.

Figure 4:
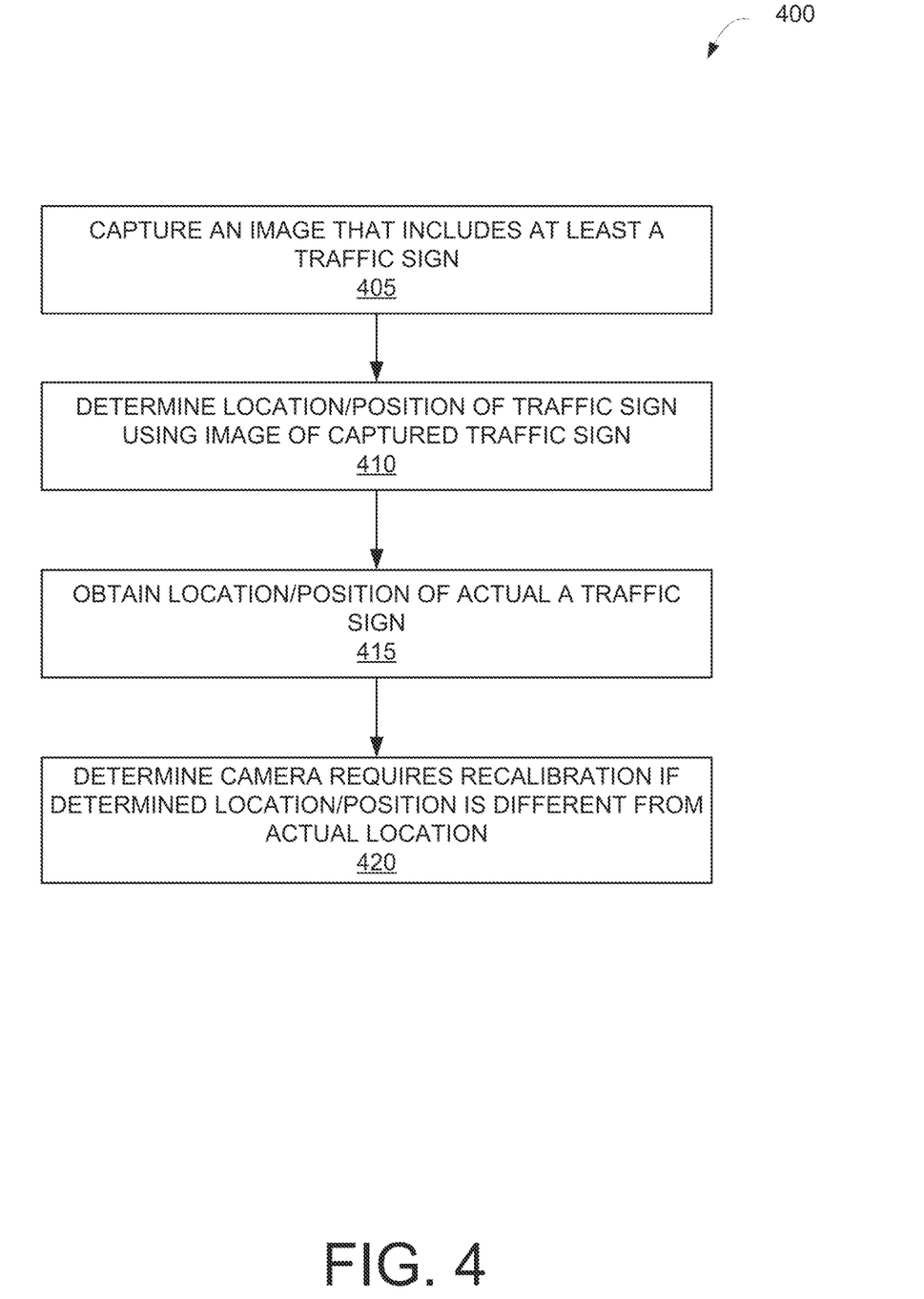
FIG. 4 is a flowchart of an example of a method for calibrating an on-board camera mount unit according to an embodiment.

FIG. 4 is a flowchart of an example of a method 400 for calibrating an on-board camera according to an embodiment. The method 400 as described here may include the steps to calibrate an on-board camera using the on-board camera calibration system as described in FIG. 2. In this and other flowcharts and/or diagrams, the flowchart illustrates by way of example a sequence of steps. It should be understood the steps may be reorganized for parallel execution, or reordered, as applicable. Moreover, some steps that could have been included may have been removed to avoid providing too much information for the sake of clarity and some steps that were included could be removed, but may have been included for the sake of illustrative clarity.

The method 400 may include step 405, which includes configuring on-board cameras of a vehicle to capture an image of an upcoming and anticipated pre-determined calibration target ahead, which may include at least a traffic sign. The on-board cameras may be signaled to capture an image of the anticipated traffic sign ahead utilizing a high-precision GPS map stored in the storage device of the vehicle. By way of example, when the GPS map detects the anticipated traffic sign ahead at a pre-determined distance, the on-board cameras may then be signaled to capture one or more images of the anticipated traffic sign.

The on-board vehicle computer of the vehicle may then determine a location and/or position of the traffic sign using the image provided by the on-board cameras at step 410. By way of example, the on-board vehicle computer may be configured to determine the location of the traffic sign from the image by taking as input the location and the direction of the vehicle and the location and the direction of the camera relative to the vehicle.

In other instances, the on-board vehicle computer may be configured to determine the position of the traffic sign from the image by taking as input the location and direction of the vehicle and the location and direction of the camera relative to the vehicle. The on-board vehicle may then be able to determine the projected position of the traffic sign, such as whether the traffic sign is at a front view, back view, left-side view, right-side view, or bottom view relative to the vehicle and the on-board camera.

Next, at step 415, the actual location and/or actual position of the traffic sign that the on-board cameras captured via image may be determined. The actual location of the traffic sign may be determined from a high-precision GPS map stored in a storage device in the vehicle. In other instances, the actual location of the traffic sign may be determined using the on-board cameras. The on-board camera may also be configured to recognize the traffic signs. Once the traffic signs are recognized and identified, the vehicle may then determine the distance between each of the on-board cameras and the traffic signs. The distance may be determined using various sensors, such as LiDAR sensors and other optical sensors.

In other instances, the actual location of the traffic sign may also be determined using a LiDAR sensor positioned on a vehicle. As described above, the LiDAR sensor may be signaled by the GPS to transmit a pulse when the GPS identifies the anticipated location of a traffic sign ahead. Thus, the LiDAR sensor may be able to determine the exact location of the actual location of the traffic sign by determining the distance of the traffic sign with respect to the location and direction of the vehicle and the on-board cameras.

In other instances, the actual position of the traffic sign may be determined. The actual position of the traffic sign may be determined by finding the actual location of the traffic sign at the time the images of the traffic sign were captured by the on-board cameras. As discussed above, the actual location of the traffic sign may be determined using any one of GPS, cameras, and LiDAR sensors. To then determine the actual position of the traffic sign, the on-board camera may then use the actual location of the traffic sign in relation to the vehicle's location and direction at the time the images of the traffic sign were captured by the on-board cameras. As a result, the on-board vehicle computer may then be able to determine the actual position of the traffic sign, which may include whether the traffic sign was positioned at a front view, back view, left-side view, right-side view, or bottom view with respect to the vehicle and on-board cameras.

To identify whether the on-board cameras 205a, 205b, 205c, 205d need to be recalibrated, the determined location and/or position of the traffic sign captured in the images are then compared to the corresponding actual location and/or position of the traffic sign at step 420.

In the instance that the determined location and/or position of the traffic sign associated with the captured image is different from the actual location and/or position of the traffic sign, the calibration unit may then be signaled that the appropriate on-board cameras that need to be recalibrated. The calibration unit may correct the location and direction of the appropriate on-board camera relative to the vehicle such that the determined position of the traffic sign, following the correction, matches the actual position of the traffic sign. Additionally, in other instances, the calibration unit may correct the position of the appropriate on-board camera relative to the vehicle such that the determined position of the traffic sign, following the correction, will now match the actual position of the traffic sign.

Figure 5:
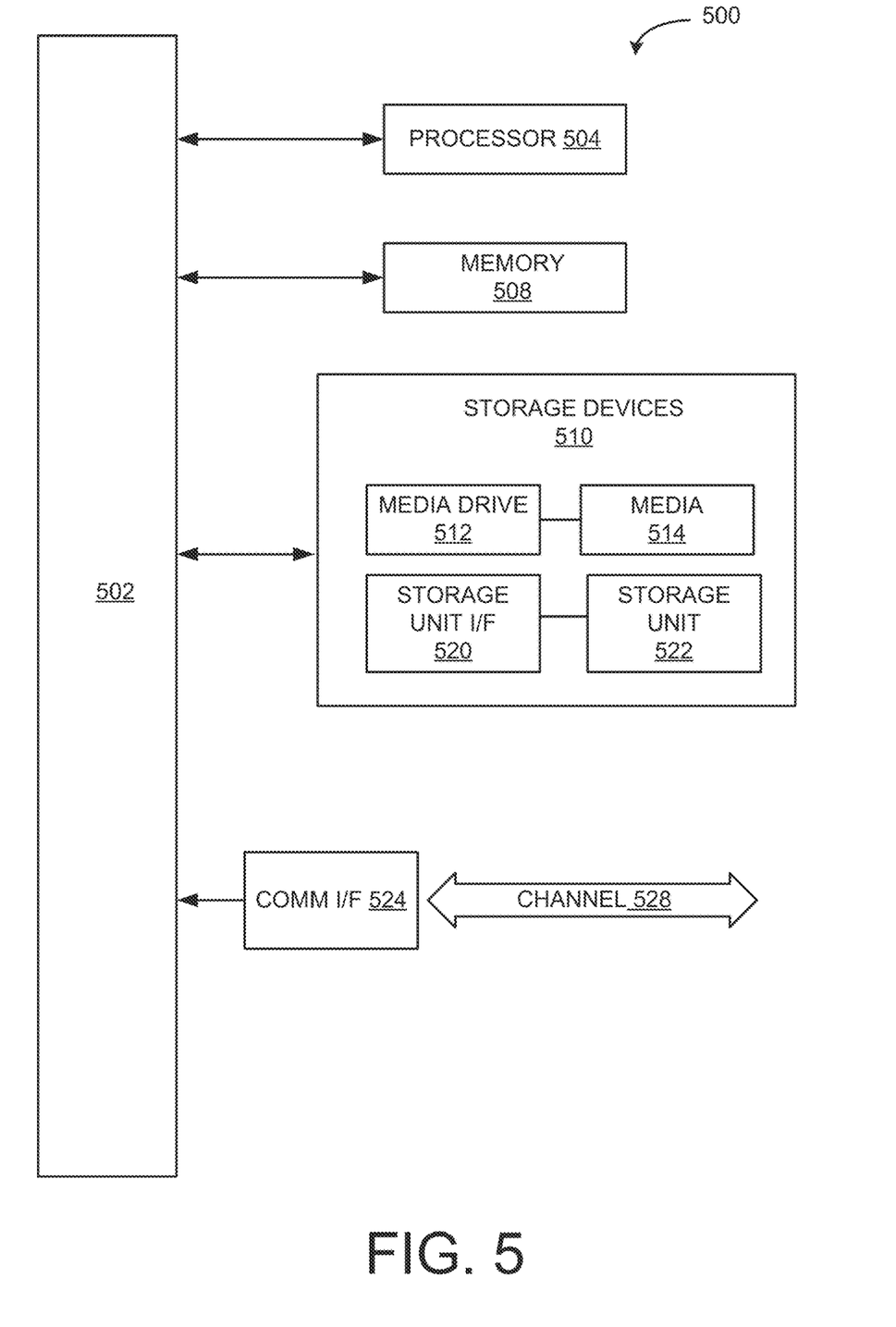
FIG. 5 depicts a block diagram of an example of a computer system upon which any of the embodiments described herein may be implemented.

FIG. 5 depicts a block diagram of an example of a computer system upon which any of the embodiments described herein may be implemented. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up navigation system 514 and its component parts, navigation server/network 524, and controller 550. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 412 might include a drive or other mechanism to support fixed or removable storage media 514. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or soft modem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

The foregoing description of the present invention has been provided for the purposes of illustration and description. It is not intended to be exhaustive or to limit the invention to the precise forms disclosed. The breadth and scope of the present invention should not be limited by any of the above-described exemplary embodiments. Many modifications and variations will be apparent to the practitioner skilled in the art. The modifications and variations include any relevant combination of the disclosed features. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method for recalibrating a camera installed on a vehicle, the method comprising:
   capturing, with the camera, an image including a traffic sign;

determining a location of the traffic sign based on the image, a location and an orientation of the vehicle, and a location and an orientation of the camera relative to the vehicle;

obtaining an actual location of the traffic sign at a same time that the location of the traffic sign is determined;

determining that the camera requires a recalibration in response to a difference between the determined location and the actual location exceeding a threshold;

correcting at least one of the location or the orientation of the camera relative to the vehicle such that the determined location of the traffic sign matches the actual location of the traffic sign; and adjusting a rate of determining whether to perform the recalibration on the camera based on a historical rate of recalibrations on the camera.

2. The method of claim 1, wherein the traffic sign is selected from a group comprising at least one of a traffic light, a stop sign, or a street sign.

3. The method of claim 2, wherein the traffic sign is a traffic light.

4. The method of claim 3, wherein two or more traffic lights are captured in the image and used for the recalibration.

5. The method of claim 1, wherein the actual location of the traffic sign is obtained from a GPS map.

6. The method of claim 1, wherein the actual location of the traffic sign is obtained by one or more other cameras on the vehicle.

7. The method of claim 1, wherein the actual location of the traffic sign is obtained by a LiDAR unit on the vehicle.

8. The method of claim 1, wherein the location and the orientation of the vehicle are determined by a GPS unit in the vehicle.

9. A system comprising:
at least one processor;
a camera; and
memory storing instructions that, when executed by the at least one processor, cause the system to perform a method comprising:
capturing, with the camera, an image including a traffic sign;
determining a location of the traffic sign based on the image, a location and an orientation of the vehicle, and a location and an orientation of the camera relative to the vehicle;
obtaining an actual location of the traffic sign at a same time that the location of the traffic sign is determined;
determining that the camera requires a recalibration in response to a difference between the determined location and the actual location exceeding a threshold;
correcting at least one of the location or the orientation of the camera relative to the vehicle such that the determined location of the traffic sign matches the actual location of the traffic sign; and
adjusting a rate of determining whether to perform the recalibration on the camera based on a historical rate of recalibrations on the camera.

10. The system of claim 9, wherein the traffic sign is selected from a group comprising at least one of a traffic light, a stop sign, or a street sign.

11. The method system of claim 10, wherein the traffic sign is a traffic light.

12. The system of claim 11, wherein two or more traffic lights are captured in the image and used for the recalibration.

13. The system of claim 9, wherein the actual location of the traffic sign is obtained from a GPS map.

14. The system of claim 9, wherein the actual location of the traffic sign is obtained by one or more other cameras on the vehicle.

15. The system of claim 9, wherein the actual location of the traffic sign is obtained by a LiDAR unit on the vehicle.

16. The system of claim 9, wherein the location and the orientation of the vehicle is determined by a GPS unit in the vehicle.

17. The method of claim 1, wherein determining the location of the traffic sign based on the image comprises:
determining a projected position of the traffic sign from the image based on an angle view of traffic sign in the image; and
comparing the projected position with other projected positions of the traffic sign in other images captured by one or more other cameras on the vehicle, wherein the projected position of the traffic sign includes at least one of a front view, a back view, a left-side view, a right-side view, or a bottom view of the traffic sign.

18. The system of claim 9, wherein determining the actual location comprises:
determining a distance between the traffic sign and the camera by calculating a propagation time of a LiDAR pulse reflected from the traffic sign; and
determining the actual location based on the determined distance and the location and the orientation of the vehicle.

* * * * *